(12) United States Patent
Chen (10) Patent No.: US 7,068,847 B1
(45) Date of Patent: Jun. 27, 2006

(54) HIGH-RESOLUTION STILL PICTURE DECODING DEVICE

(75) Inventor: Wen-Kuan Chen, Hsinchu Hsien (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 768 days.

(21) Appl. No.: 09/657,585

(22) Filed: Sep. 8, 2000

(51) Int. Cl.
*G06K 9/36* (2006.01)

(52) U.S. Cl. ................ 382/233; 375/240.25; 345/536; 345/547

(58) Field of Classification Search ........ 345/536–540, 345/542, 545, 547, 548, 555, 559, 567; 382/232, 382/233; 375/240.25
See application file for complete search history.

(56) References Cited

U.S. PATENT DOCUMENTS

| | | | | |
|---|---|---|---|---|
| 5,146,325 A | * | 9/1992 | Ng | 348/384.1 |
| 5,790,138 A | * | 8/1998 | Hsu | 345/542 |
| 5,850,264 A | * | 12/1998 | Agarwal | 348/469 |
| 5,903,282 A | * | 5/1999 | Schoner et al. | 345/558 |
| 6,141,385 A | * | 10/2000 | Yamaji | 375/240.27 |
| 6,594,315 B1 | * | 7/2003 | Schultz et al. | 382/233 |

* cited by examiner

*Primary Examiner*—Vikkram Bali
*Assistant Examiner*—Colin LaRose
(74) *Attorney, Agent, or Firm*—Bacon & Thomas, PLLC (57) ABSTRACT

A high-resolution still picture decoding device is disclosed, which has a memory device, an image decoder, and a decoding controller. The memory device has a bit-stream buffer, a frame buffer and a temporary buffer. The image decoder and decoding controller decode the bit-stream data in the bit-stream buffer and store the decoded data in the frame buffer or temporary buffer. When a still picture is to be displayed, the frame buffer stores part of the frame data corresponding to the still picture and the temporary buffer is provided to store the other frame data which is decoded in real time as the still picture is displayed. The data in the frame buffer and temporary buffer is output for displaying a high-resolution still picture.

10 Claims, 7 Drawing Sheets

FIG. 1

MB PIXELS OF Y COMPONENT

FIG. 2A

MB PIXELS OF Cb COMPONENT    MB PIXELS OF Cr COMPONENT

HIGH-RESOLUTION STILL PICTURE DECODING DEVICE

BACKGROUND OF THE INVENTION

1. Field of the Invention

The present invention relates to a device for decoding a still picture and, more particularly, to a decoding device capable of displaying high-resolution still picture with limited memory.

2. Description of Related Art

Figure 8:
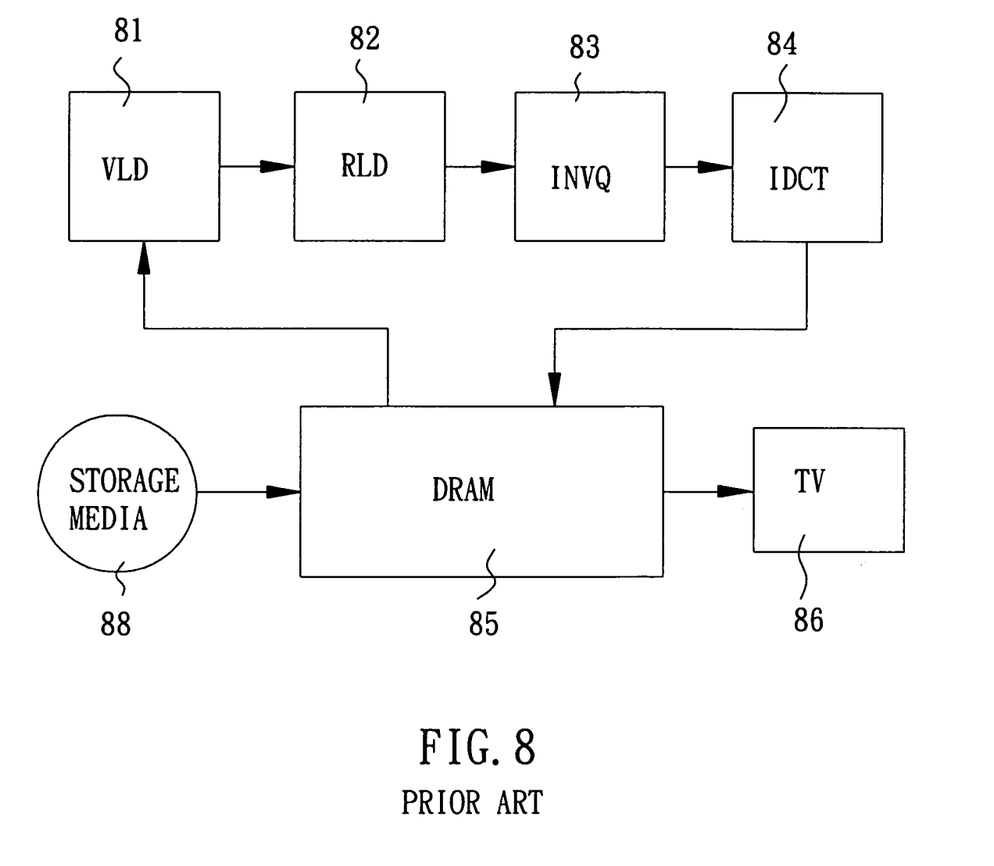
FIG. 8 shows a hardware structure of a conventional still picture decoding device.

Recently, because the video and multimedia applications have become so popular, the video compress and de-compress techniques, such as MPEG1, MPEG2 and H.263, are in wide spread use. FIG. 8 shows the structure that implements the compress and de-compress process. First, bit-stream data is read from a storage media 88 and then sent to a variable-length decoder (VLD) 81 for decompressing the Huffman data. A run-length decoder (RLD) 82 is provided to pad zeros into the decompressed Huffman data and send it to an inverse quantizer (INVQ) 83 to reconstruct time domain data. Finally, an inverse discrete cosine transformation (IDCT) unit 84 is provided to process the data to complete the decoding process. When the process is applied to a general system, for example, VCD, SVCD, or DVD, there are many high-resolution still picture applications. The high-resolution data is decoded and stored in dynamic random access memory (DRAM) 85 to furnish displaying data on the television device 86. In the VCD application, the data size of a PAL full frame is 704×576×1.5=608,256 bytes. However, in a typically VCD application, the system usually has 4M bit DRAM, which is equal to 512 K byte and is obviously less than 608,256 bytes. Moreover, there may be other demands for memory, such as the memory for processing OSD (On Screen Display) and audio signal. Therefore, it is difficult to achieve the aforementioned functions with limited memory.

To solve the problem, a direct way is to discard part of the picture data for decreasing the required memory. However, this may significantly reduce the output resolution and thus derogate the output image quality. Therefore, there is a need to have a novel design for displaying high-resolution still picture with limited memory.

SUMMARY OF THE INVENTION

The object of the present invention is to provide a high-resolution still picture decoding device, such that the device can decode high-resolution still picture with limited memory while the operating frequency thereof is not increased.

To achieve the object, the high-resolution still picture decoding device of the present invention includes a memory device and a decoding means. The memory device has a bit-stream buffer, a temporary buffer and a frame buffer, wherein the bit-stream buffer is used to store bit-stream data from a storage media. The decoding means is provided for decoding the bit-stream data in the bit-stream buffer and storing decoded frame data in the frame buffer or the temporary buffer, such that, when a still picture is to be displayed, the frame buffer stores part of the frame data corresponding to the still picture and the temporary buffer is provided to store the other frame data which is decoded in real time as the still picture is displayed, and the data in the frame buffer and temporary buffer is output for displaying a high-resolution still picture.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
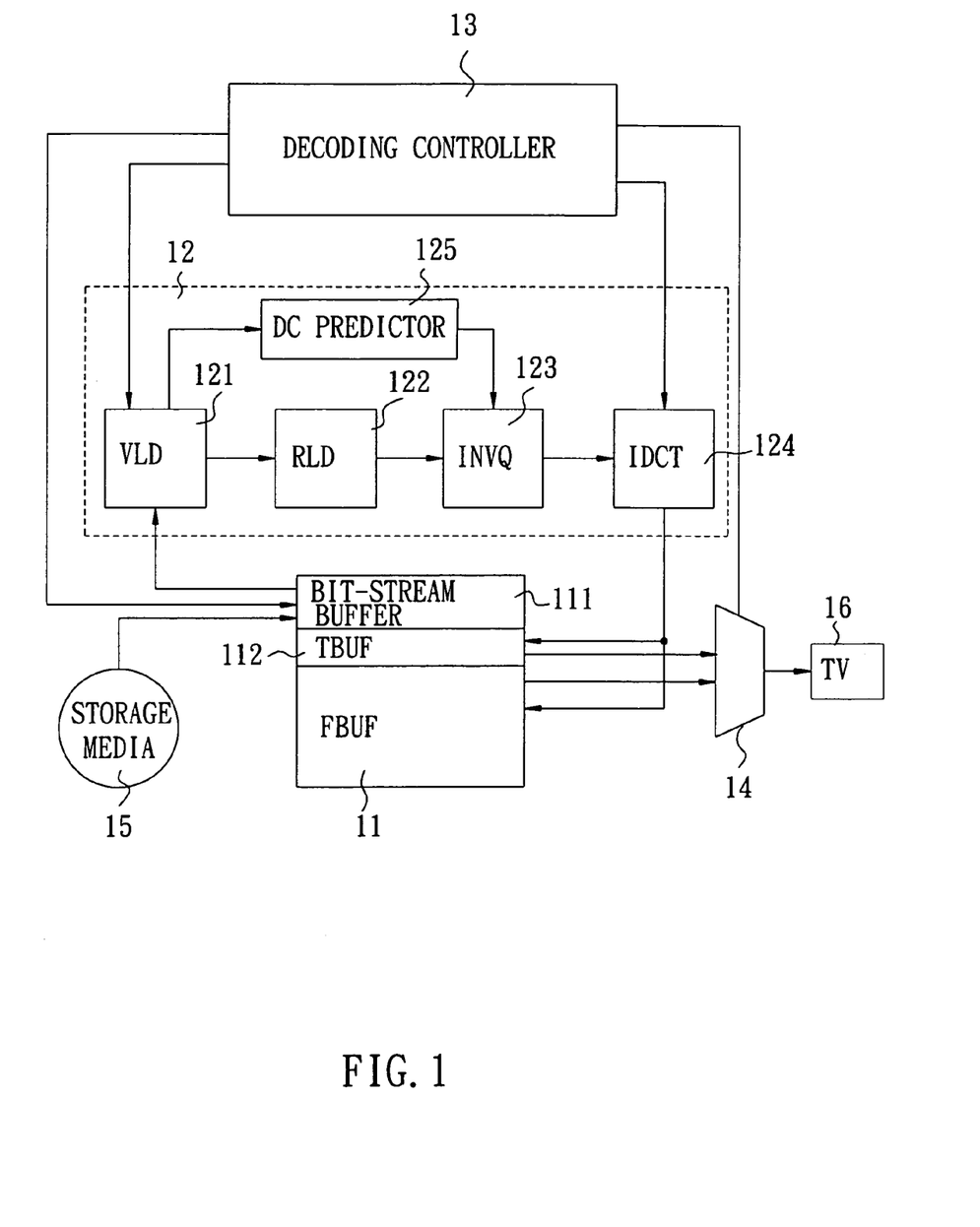
FIG. 1 shows the hardware architecture of a high-resolution still picture decoding device in accordance with a preferred embodiment of the present invention.

Referring now to FIG. 1, there is illustrated a schematic diagram of a high-resolution still picture decoding device in accordance with a preferred embodiment of the present invention, which is composed of a memory device 11, an image decoder 12, a decoding controller 13 and a multiplexer 14. The memory device 11 is programmed to have a bit-stream buffer 111, a temporary buffer 112 (TBUF) and a frame buffer 113 (FBUF). The bit-stream data that represents a video frame is read from a storage media 15 and stored in the bit-stream buffer 111. Under the control of the decoding controller 13, the image decoder 12 decodes the data in the bit-stream buffer 111 and stores the decoded frame data in the memory device 11, so as to display the corresponding picture on a television device 16.

Figure 2A:
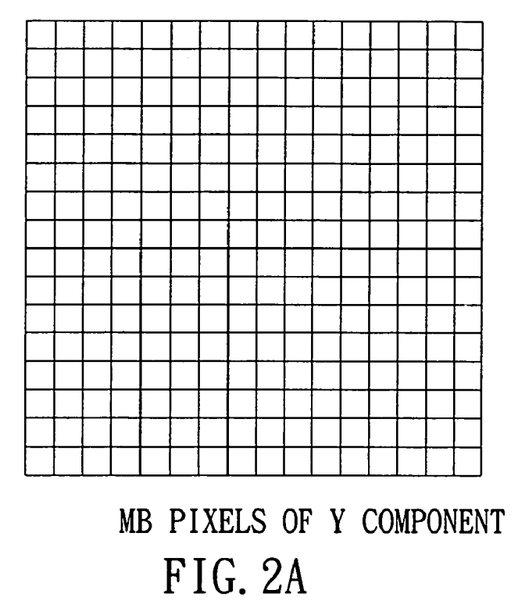
FIG. 2A schematically illustrates a luminance macroblock.
Figure 2B:
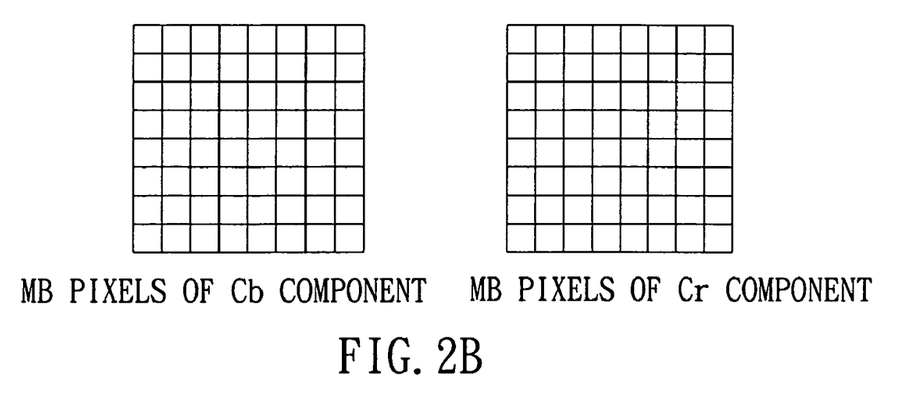
FIG. 2B schematically illustrates a chrominance macroblock.

The aforementioned image decoder 12 is provided to decode the bit-stream data for generating the corresponding video frame. Taking the MPEG system as an example, a video frame is composed of multiple macroblocks (MB), each having a luminance component and a chrominance component. With reference to FIG. 2A, the corresponding macroblock of luminance component (denoted as Y-MB) has 16×16 pixels, each representing a luminance value. With reference to FIG. 2B, the corresponding macroblock of chrominance component is composed of a blue macroblock (denoted as Cb-MB) and a red macroblock (denoted as Cr-MB). Each of the Cb-MB and Cr-MB has 8×8 pixels. A pixel in the Cb-MB represents a blue chrominance value and a pixel in the Cr-MB represents a red chrominance value. Therefore, each chrominance macroblock (denoted as CbCr-MB) has 8×16 pixels.

Figure 3A:
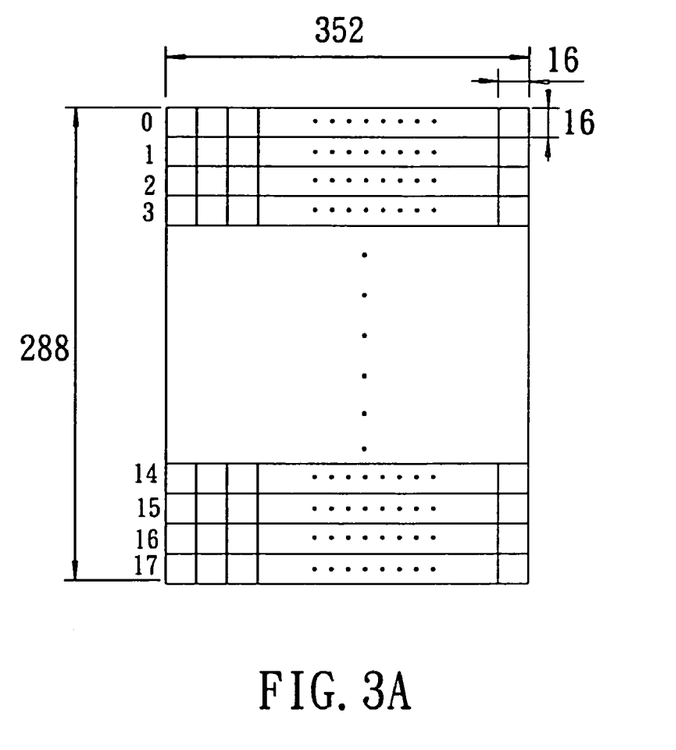
FIG. 3A schematically illustrates the frame data format for luminance component.
Figure 3B:
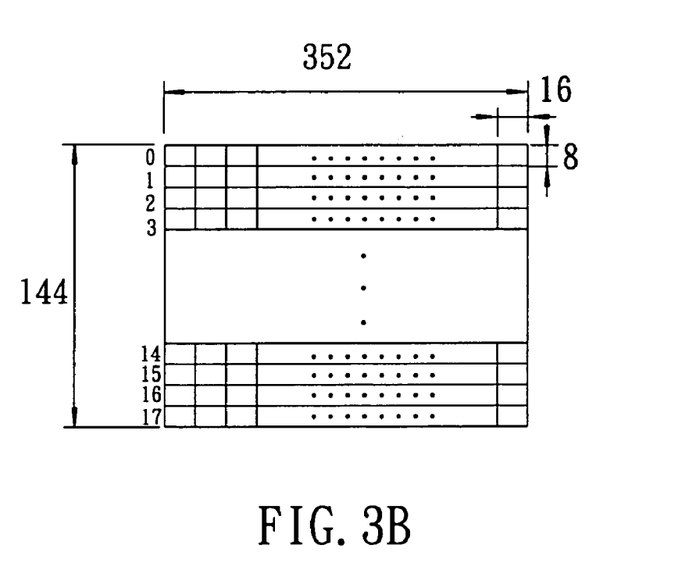
FIG. 3B schematically illustrates the frame data format for chrominance component.

For saving the memory space, only a part of the frame data in the frame buffer 113 of the memory device 11 is kept, while the rest of the frame data is decoded in real time for being displayed as the still picture. Taking the QSIF format (frame size is 352 pixel×288 line) of MPEG1 as an example, the FIG. 3A and FIG. 3B show the decoded raw frame data (i.e., without interpolation) of luminance and chrominance component, respectively. The frame data is composed a plurality of macroblock lines (MBLs). The luminance part contains 18 macroblock lines (numbered from 0 to 17), and each macroblock line has 352×16 pixels (i.e. 22 Y-MB), and the chrominance part also has 18 macroblock lines (numbered from 0 to 17), and each macroblock line has 352×8 CbCr pixels interleavingly arranged (i.e., 22 CbCr-MB).

Figure 4A:
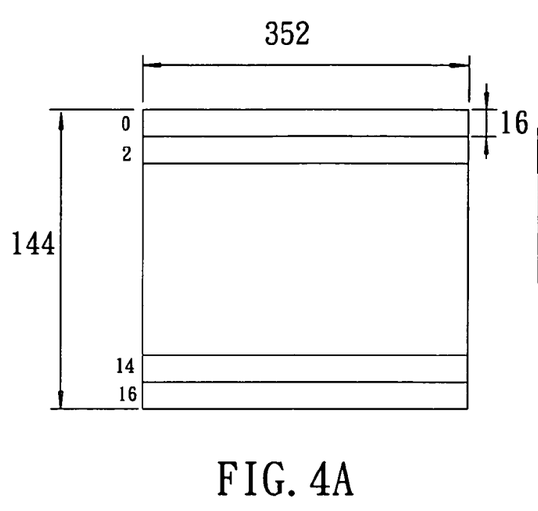
FIG. 4A schematically illustrates the luminance macroblock lines stored in a frame buffer in accordance with the present invention.
Figure 4B:
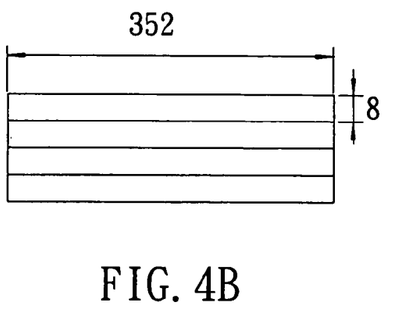
FIG. 4B schematically illustrates the luminance macroblock lines stored in a temporary buffer in accordance with the present invention.
Figure 4C:
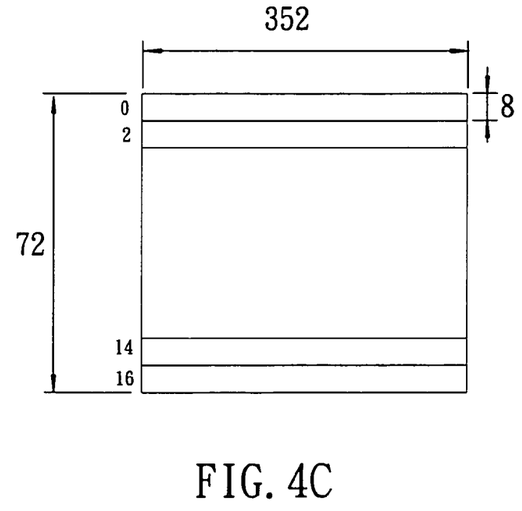
FIG. 4C schematically illustrates the chrominance macroblock lines stored in the frame buffer in accordance with the present invention.
Figure 4D:
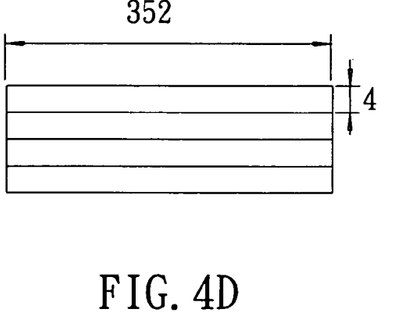
FIG. 4D schematically illustrates the chrominance macroblock lines stored in the temporary buffer in accordance with the present invention.

In this preferred embodiment, only half of the frame data is stored in the frame buffer 113 of the memory device 11. Referencing to FIG. 4A and FIG. 4C, FIG. 4A shows that the even numbered luminance macroblock lines, as shown in FIG. 3A, are kept in the frame buffer 113, and FIG. 4C shows that the even numbered chrominance macroblock lines, as shown in FIG. 3B, are kept in the frame buffer 113. The temporary buffer 112 with a small amount of memory is provided to dynamically store the macroblock lines that are not kept in memory, and the dynamically stored macroblock lines are decoded in real-time for being displayed as the still picture picture. As the still picture is displayed in an interlace manner, the height of the macroblock lines in the temporary buffer 112 is only half of that of the macroblock lines in the frame buffer 113. FIG. 4B and FIG. 4D respectively illustrate the macroblock lines of the luminance and chrominance in the temporary buffer 112. The temporary buffer 112 should have a memory space for containing at least one luminance macroblock line and at least one chrominance macroblock line. In this preferred embodiment, the memory space of the temporary buffer 112 can contain 4 luminance macroblock lines and 4 chrominance macroblock lines.

Figure 5:
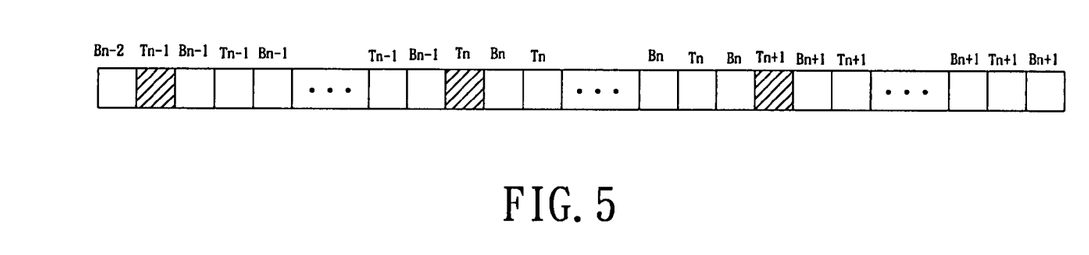
FIG. 5 shows a practical timing sequence for displaying high-resolution still picture.
Figure 6:
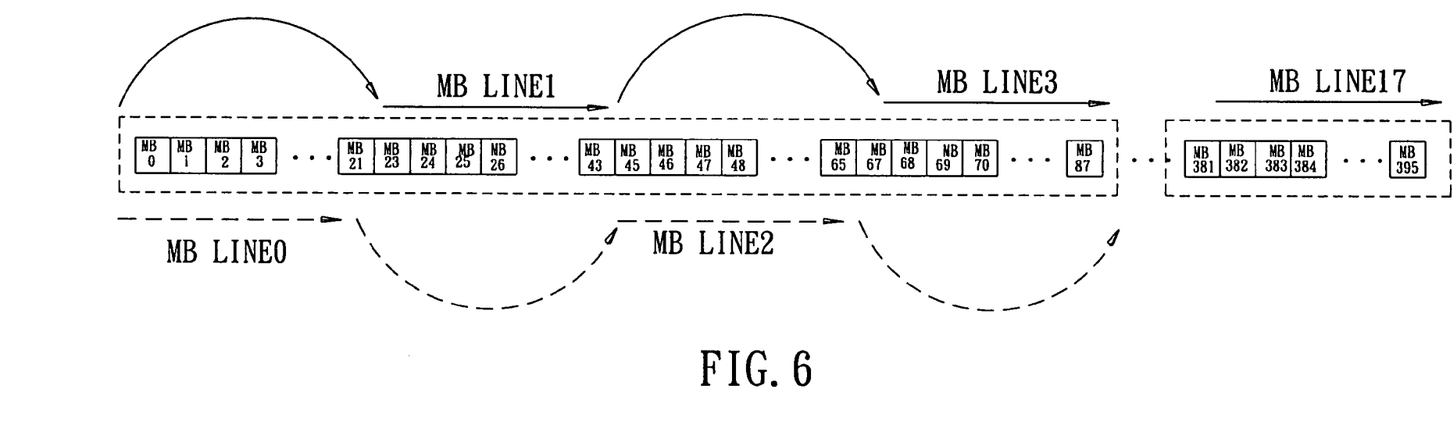
FIG. 6 shows a bit-stream decoding flowchart in accordance with the present invention.

FIG. 5 shows a practical timing sequence as displaying a high-resolution still picture, wherein, each block represents a frame field. Tn represents the displaying time for the top field of the n-th frame, and Bn represents the displaying time for the bottom field of the n-th frame. If system is switched to display a still picture in the areas of the fields 51, 52 and 53, the bit-stream of a frame from the bit-stream buffer 111 is decoded, in the time points of the fields 51, 52 and 53, by the bit-stream decoding flow as shown in FIG. 6. In one field display time of the top filed, a first decoding process, as denoted by dash line, is carried out to decode the even numbered macroblock lines by using the image decoding device 12, and the decoded frame data is stored in the frame buffer 113. In one field display time of the other fields shown in FIG. 5, the bit-stream of a frame from the bit-stream buffer 111 is decoded by a second decoding process, as denoted by solid line, shown in FIG. 6 for decoding the odd numbered macroblock lines by using the image decoding device 12, and the decoded frame data is stored in temporary buffer 112. Therefore, if the frame data corresponding to the field required to be stored in the memory device 11 is decoded, in a time duration for displaying the data of a macroblock line, based on the second decoding process and stored in the temporary buffer 112, the display of still pictures can be fulfilled. That is, under the control of the decoding controller 13, the decoded data stored in the frame buffer 113 and temporary buffer 112 is applied to the multiplexer 14 for selecting one to output to the TV device 16 for display.

The aforementioned macroblock lines, which are kept in the frame buffer 113, are stored in a manner of skipping one macroblock line. However, the macroblock lines can be stored in a manner of skipping more than one macroblock lines or skipping irregular numbers of macroblock lines. The operations thereof are analogous to the aforementioned embodiment.

Figure 7:
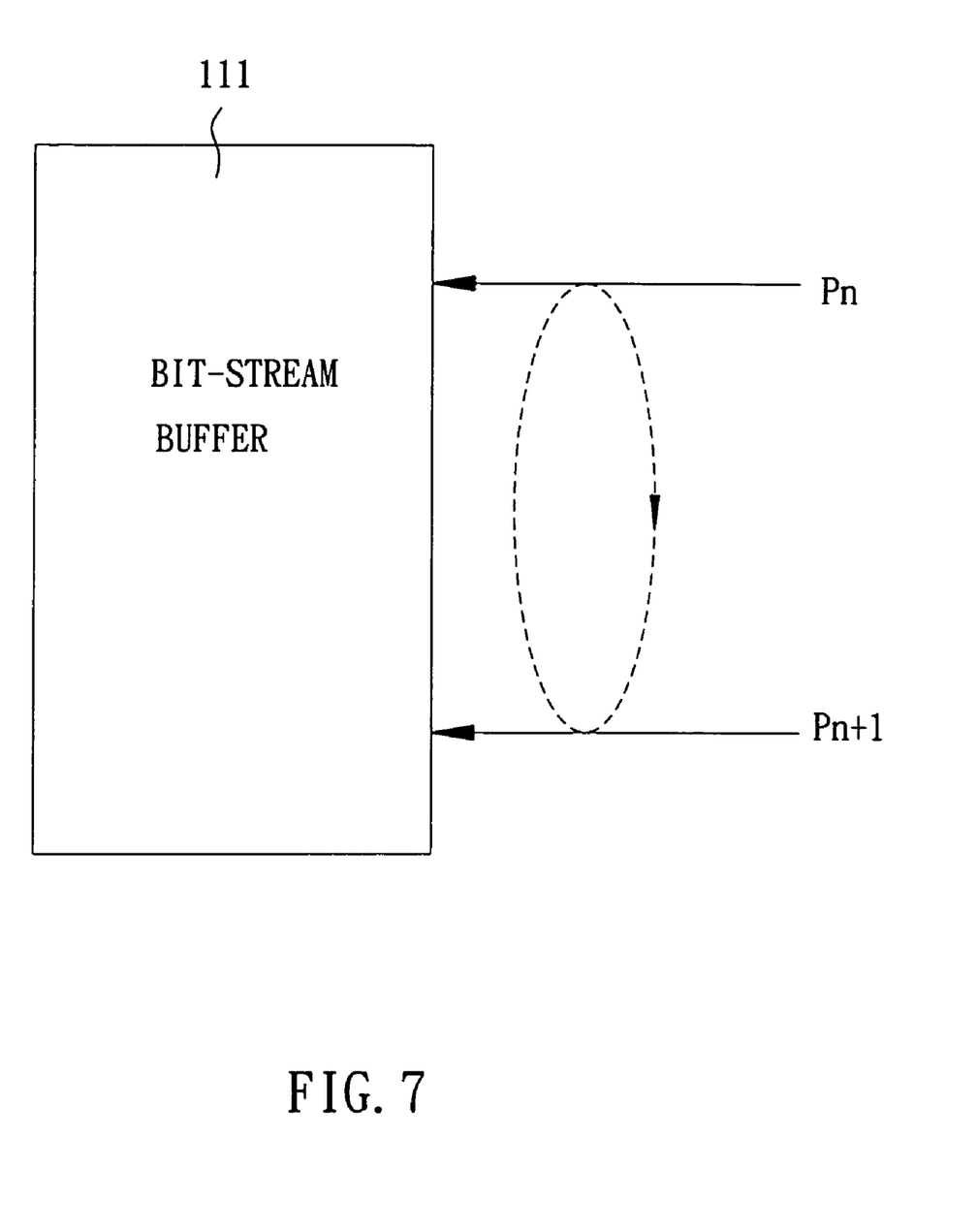
FIG. 7 shows the use of two pointer to point to the bit-stream buffer for setting a picture range to perform read operations in a cyclic and repeated manner.

Also with reference to FIG. 5, the second decoding process is undertaken repeatedly in the field display time that is not for displaying still picture. Therefore, as shown in FIG. 7, it is preferred to have a pointer $P_n$ for pointing to the head of the n-th picture and a pointer $P_{n+1}$ for pointing to the head of the (n+1)-th picture in the bit-stream data when reading bit-stream data from the bit-stream buffer 111. As such, the read of bit-stream data can be cyclically repeated in the picture range addressed by the two pointers.

With reference to FIG. 1 again, the image decoding device 12 includes a variable-length decoder 121, a run-length decoder 122, an inverse quantizer 123, an inverse discrete cosine transform (IDCT) unit 124 and a DC predictor 125. From the above description, it is known that bit-stream data is read out from the storage media 15 and stored in bit-stream data buffer 111. The decoding controller 13 transfers the data, as shown in FIG. 7, to the variable-length decoder 121. The data is processed by the run-length decoder 122, inverse quantizer 123 and inverse discrete cosine transform unit 124 sequentially. Because the decoding process shown in FIG. 6 is carried out by skipping one or more macroblock lines, the variable-length decoder 121 must be able to discard the unnecessary macroblock lines. However, in the MPEG 1 specification, a slice may be across over several macroblock lines. Therefore, the bit-stream data processed by the variable-length decoder 112 is forwarded to the DC predictor 125 to preserve its DC component. If the bit-stream data is of the MPEG 2 format, the DC predictor 125 can be turned off, and the data to be process is of the format having one macroblock skipped.

The data which is decoded by and output from the inverse discrete cosine transform unit 124 is stored in frame buffer 113 or temporary buffer 112 of the memory device 11, under the control of the decoding controller 13. When the data is to be stored in the frame buffer 113, a whole macroblock must be stored, and thus, the inverse discrete cosine transform unit 124 processes the data from the inverse quantizer 123 and stores the data in frame buffer 113 completely. As for the data to be stored in the temporary buffer 112, only the data required for a field is determined.

In view of the foregoing, it is appreciated that the present invention only needs to store half of the frame data by the particular management of frame data. Further with the help of proper management of bit-stream buffer and the skipping macroblock process of the variable-length decoder, it can effectively display a still picture with a limited memory. The resolution and quality of the decoded still picture are satisfactory. In addition, the operating frequency of the decoding structure is not increased.

Although the present invention has been explained in relation to its preferred embodiment, it is to be understood that many other possible modifications and variations can be made without departing from the spirit and scope of the invention as hereinafter claimed.

What is claimed is:

1. A high-resolution still picture decoding device, comprising:

a memory device having a bit-stream buffer, a temporary buffer and a frame buffer, the bit-stream buffer being adapted to store bit-stream data from a storage media; and a decoding means for decoding the bit-stream data in the bit-stream buffer and storing decoded frame data in the frame buffer or the temporary buffer, such that, when a still picture is to be displayed, the frame buffer stores a part of the frame data that has been decoded from a part of the bit-stream data and corresponds to the still picture, and the temporary buffer is provided to store the other frame data from the other part of the bit-stream data which has not been decoded and which is to be decoded in real time as the still picture is being displayed, and the decoded frame data in the frame buffer and the real-time decoded frame data from the temporary buffer are output for displaying a high-resolution still picture, wherein the frame data from the bit-stream buffer is represented by multiple macroblock lines after being decoded by the decoding means, the frame buffer only stores a portion of the macroblock line that has been decoded and corresponds to the frame data of the still picture, and the temporary buffer has a memory space for storing at least one macroblock line for decoding in real time as the still picture is being displayed, wherein the frame buffer stores only a half of the frame data that has been decoded and corresponds to the picture and the temporary buffer has a memory space less than that of the frame buffer.

2. The high-resolution still picture decoding device as claimed in claim 1, wherein the frame buffer stores even numbered macroblock lines that have been decoded and correspond to the frame data of the picture.

3. The high-resolution still picture decoding device as claimed in claim 1, further comprising a multiplexer which selects the decoded frame data in the frame buffer or the real-time decoded framed data from the temporary buffer to output.

4. A high-resolution still picture decoding device, comprising:

a memory device having a bit-stream buffer, a temporary buffer and a frame buffer, the bit-stream buffer being adapted to store bit-stream data from a storage media; and a decoding means for decoding the bit-stream data in the bit-stream buffer and storing decoded frame data in the frame buffer or the temporary buffer, such that, when a still picture is to be displayed, the frame buffer stores a part of the frame data that has been decoded from a part of the bit-stream data and corresponds to the still picture, and the temporary buffer is provided to store the other frame data from the other part of the bit-stream data which has not been decoded and which is to be decoded in real time as the still picture is being displayed, and the decoded frame data in the frame buffer and the real-time decoded frame data from the temporary buffer are output for displaying a high-resolution still picture, wherein the frame data from the bit-stream buffer is represented by multiple macroblock lines after being decoded by the decoding means, the frame buffer only stores a portion of the macroblock line that has been decoded and corresponds to the frame data of the still picture, and the temporary buffer has a memory space for storing at least one macroblock line for decoding in real time as the still picture is being displayed, wherein the frame buffer stores even numbered macroblock lines that have been decoded and correspond to the frame data of the picture, and wherein the macroblock lines decoded in the temporary buffer have a height half of the height of the macroblock lines in the frame buffer that have been decoded.

5. The high-resolution still picture decoding device as claimed in claim 4, wherein, for a field of a displaying still picture and in a time point of switching to display the still picture, the bit-stream of a frame from the bit-stream buffer is processed by a first decoding process in one field display time of a top field to decode the even numbered macroblock lines, and the decoded frame data is stored in the frame buffer, while in one field display time of the other fields, the bit-stream of a frame from the bit-stream buffer is processed by a second decoding process to decode the odd numbered macroblock lines.

6. The high-resolution still picture decoding device as claimed in claim 5, wherein the second decoding process is repeatedly executed and there are two pointers for setting a picture range in which read operations of bit-stream data are cyclically repeated.

7. The high-resolution still picture decoding device as claimed in claim 6, wherein the decoding means has an image decoder which comprises a variable-length decoder, a run-length decoder, an inverse quantizer and an inverse discrete cosine transform unit, and data read out from bit-stream buffer is processed by the variable-length decoder, run-length decoder, inverse quantizer, and inverse discrete cosine transform unit sequentially for being stored in frame buffer or temporary buffer.

8. The high-resolution still picture decoding device as claimed in claim 7, wherein the variable-length decoder discards unnecessary macroblock lines for decoding.

9. The high-resolution still picture decoding device as claimed in claim 7, wherein the image decoder further comprises a DC predictor for preserving DC component of the bit-stream data processed by the variable-length decoder.

10. The high-resolution still picture decoding device as claimed in claim 7, wherein, only data of one field is determined by the inverse discrete cosine transform for being stored into the temporary buffer.

* * * * *